United States Patent [19]

McGreevy et al.

[11] Patent Number: 5,341,263
[45] Date of Patent: Aug. 23, 1994

[54] APPARATUS FOR DEMAGNETIZING THE MAGNETIC HEAD OF A CASSETTE TAPE RECORDING AND/OR REPRODUCING DEVICE

[75] Inventors: William T. McGreevy, Babylon; Robert L. Borchardt, New York, both of N.Y.

[73] Assignee: Recoton Corporation, Long Island City, N.Y.

[21] Appl. No.: 959,727

[22] Filed: Oct. 13, 1992

[51] Int. Cl.$^5$ .............................................. G11B 5/465
[52] U.S. Cl. .............................................. 360/128
[58] Field of Search ................... 360/128, 132, 137

[56] References Cited

U.S. PATENT DOCUMENTS

| | | | |
|---|---|---|---|
| 3,381,097 | 4/1968 | Atsumi . | |
| 3,443,037 | 5/1969 | Dana . | |
| 3,647,990 | 2/1972 | Eul, Jr. et al. | 360/128 |
| 3,810,230 | 5/1974 | Orloski et al. | 360/128 |
| 4,135,219 | 1/1979 | Yoshizawa et al. | 360/128 |
| 4,183,070 | 1/1980 | Fujita | 360/128 |
| 4,224,649 | 9/1980 | Alexandrovich, Sr. | 360/128 |
| 4,378,582 | 3/1983 | Maier et al. | 360/128 |
| 4,442,468 | 4/1984 | d'Alayer | 360/128 |
| 4,843,509 | 6/1989 | Andreas | 360/128 |
| 4,849,843 | 7/1989 | Fujita et al. | 360/128 |
| 4,851,945 | 7/1989 | Fritsch et al. | 360/128 |
| 4,992,902 | 2/1991 | Tani | 360/128 |

FOREIGN PATENT DOCUMENTS

| | | |
|---|---|---|
| 0114115 | 7/1984 | European Pat. Off. . |
| 55-4709 | 1/1980 | Japan . |
| 57-169908 | 10/1982 | Japan . |
| 57-191826 | 11/1982 | Japan . |
| 60-170018 | 9/1985 | Japan . |
| 60-197919 | 10/1985 | Japan . |

Primary Examiner—Stuart S. Levy
Assistant Examiner—Paul J. Ditmyer
Attorney, Agent, or Firm—Curtis, Morris & Safford

[57] ABSTRACT

An improved demagnetizer for the magnetic heads of a tape cassette recording and/or reproducing device. The device includes an intermediate gear which is rotated by either one of two hub gears engaging respective drive spindles of the recording and/or reproducing device. A push-pull rod has one end pivotally connected to an outer radial position of the intermediate gear and another end pivotally connected to a generator of an alternating magnetic field of constant intensity. Power is supplied from a battery to the generator of an alternating magnetic field upon closure of a power switch caused by motion of the magnetic head into the "play" position. Rotation of the intermediate gear causes the magnetic field generator to be cyclically and linearly reciprocated with respect to the head so as to produce a varying magnetic field at the head. A sensor senses when the magnetic field generator has been reciprocated to its farthest point from the head and a circuit counts the number of such sensings. After a predetermined number of counts, the circuit shuts off power to the magnetic field generator when the magnetic field generator is at its farthest point from the head.

14 Claims, 4 Drawing Sheets

APPARATUS FOR DEMAGNETIZING THE MAGNETIC HEAD OF A CASSETTE TAPE RECORDING AND/OR REPRODUCING DEVICE

FIELD OF THE INVENTION

The present invention relates to apparatus for demagnetizing a magnetic head of a cassette tape recording and/or reproducing device and in particular relates to a cassette-shaped demagnetizing apparatus which may be inserted in a recording and/or reproducing device for demagnetizing one or more of the magnetic heads thereof.

BACKGROUND OF THE INVENTION

In a conventional cassette tape recording and/or reproducing device, signals are recorded on and reproduced from a magnetic tape held within a cassette which is placed in or on a cassette holder of the device. The cassette holder is frequently a tape receiving recess and the device includes a tape transport system having two reel drive spindles which project into the recess. The cassette correspondingly incorporates a take-up hub and a supply hub adapted to receive respective ones of the drive spindles. The drive spindles may be rotated either clockwise or counter-clockwise to rotate the hubs and thereby effect transfer of the tape from one hub to the other depending on the direction of rotation.

The recording and reproducing of signals on the tape within the cassette is carried out by means of magnetic heads whose construction is well known. The magnetic heads, which may include record heads, reproduce heads, erase heads and the like, are mounted within the device at operative positions relative to the cassette holder and drive spindles, and the cassette has defined portions in a side wall with openings into which the respective magnetic heads extend to contact the tape when the cassette is in the cassette holder for recording and reproducing signals. All such magnetic heads acquire residual magnetism over a period of time, and unless they are demagnetized (degaussed), the residual magnetism will cause noise and distortion during recording and/or during playback.

It is well known that the application of an alternating magnetic field having flux peaks of decreasing magnitude is effective to demagnetize the heads. This type of magnetic field, although periodically varying in intensity, will be referred to in this application as a decreasing magnetic field. An alternating magnetic field having flux peaks of constant magnitude will be referred to herein as a constant magnetic field, although in actuality it is constant neither in intensity or polarity.

Various head demagnetizers for providing a decreasing magnetic field have been proposed which are constructed in a cassette-shaped housing and are adapted to be positioned in the recording and/or reproducing device in place of a tape cassette. These demagnetizers have utilized the driving power from the spindles to produce the decreasing magnetic field. One way this is done is to fix a magnetic field generator within the housing at the wall portion adjacent each operative position, thus also a "demagnetizing" position, and to electronically decrease the magnetic field, for example by discharging a capacitor. Another way is to use the drive spindles to rotate a permanent magnet and so produce the alternating magnetic field and to mechanically withdraw the rotating magnet from the demagnetizing position. Such prior art demagnetizers have tended to be relatively complicated in construction, either electrically or mechanically. Since a cassette demagnetizer is intended to be relatively inexpensive, useful over a long period of time and operated by unsophisticated consumers, it would be highly advantageous for it to have a minimum number of parts, mechanical or electrical. Such a demagnetizer, however, must still achieve a sufficient relative decrease in the magnetic field to produce the desired demagnetizing effect.

In U.S. Pat. No. 4,843,509, it is proposed to overcome the foregoing disadvantages by means of a tape cassette recording and/or reproducing device including an intermediate gear rotated by either one of two hub gears engaging respective drive spindles of the recording and/or reproducing device. A push-pull rod is provided with one end pivotally connected to an outer radial position of the intermediate gear. The other end of the rod includes a generator of alternating magnetic field of constant intensity, specifically an electromagnet connected to alternating current. Power is supplied from a battery to the generator of an alternating magnetic field upon closure of a power switch by the operator prior to insertion of the demagnetizing device into the recording and/or reproducing device. Rotation of the intermediate gear causes the electromagnet to be cyclically and linearly reciprocated with respect to the head so as to produce a decreasing magnetic field at the head as the electromagnet is drawn away from it.

While this approach provides the necessary alternating magnetic field of decreasing intensity, this approach is disadvantageous in that the magnetic field also increases in intensity when the electromagnet approaches the head. For optimum demagnetization, the magnetic field should be at the minimum strength, rather than at a maximum, when the demagnetization operation ends. In this prior art approach, this can only be accomplished by means of the operator manually stopping the cycle when the electromagnet is at its farthest point. Because the operators of these demagnetizers may be relatively unsophisticated, the operator may neglect to stop the cycle at the appropriate time, thus decreasing the effectiveness of the demagnetization. The operator may also neglect to turn on the power switch, thereby rendering demagnetization completely ineffective, or neglect to turn off the switch when the cycle in complete, thereby draining the battery unnecessarily.

OBJECTS AND SUMMARY OF THE INVENTION

It is an object of the present invention to provide apparatus for demagnetizing a magnetic head of a cassette tape recording and/or reproducing device which avoids the above-described difficulties of the prior art.

It is a further object of the present invention to provide apparatus for demagnetizing a magnetic head of a cassette tape recording and/or reproducing device which is inexpensive, simple in construction and contains a minimum of parts, mechanical or electrical.

It is yet a further object of the present invention to provide an apparatus for demagnetizing a magnetic head of a cassette tape recording and/or reproducing device which simplifies the generation of a decreasing magnetic field.

It is a still further object of the present invention to provide such apparatus which maximizes the demagnetizing effect of the generated magnetic field.

It is a still further object of the present invention to provide a demagnetizing apparatus which automatically shuts off the alternating magnetic field after it has decreased to its minimum level.

It is a yet further object of the present invention to provide a demagnetizing apparatus which automatically turns on the power switch when the apparatus is inserted into the recording/reproducing apparatus and the "play" and/or "record" cycle begins and turns off the power switch when the "play" and/or "record" cycle ends.

In accordance with an aspect of the present invention, apparatus for demagnetizing a magnetic head of a cassette tape recording and/or reproducing device of the type having a tape holding means capable of holding a cassette in predetermined relation to the head when the head is at an operative position, and tape transport means including first and second spaced reel drive spindles comprises a cassette-shaped housing adapted to be held by the holding means and having a portion of a wall adjacent the head at the operative position when the housing is held by the holding means, hub gear means rotatably mounted in the housing and adapted to be driven in rotation by at least one of the drive spindles, electromagnet means for producing an alternating magnetic field having flux peaks of constant magnitude and being positionable at the wall portion, mechanical coupling means for coupling said electromagnet means to said hub gear means so that said electromagnet means is rectilinearly reciprocated with respect to said wall portion along a path within the housing substantially perpendicular to said wall portion in response to rotation of the hub gear means, automatic shut-off means comprising means for determining when the electromagnet means is at its farthest point from said head, counting means for counting the number of reciprocation cycles of said electromagnet means, and shut-off means for automatically shutting off power to said electromagnet means when the number of reciprocation cycles reaches a predetermined number and when said electromagnet means is at its farthest point from said head.

In accordance with an aspect of this invention, the apparatus for demagnetizing a magnetic head of a cassette tape recording and/or reproducing device includes a power switch adapted to be automatically actuated to the on position by movement of the magnetic head toward the switch and to the off position by movement of the magnetic head away from the switch.

These and other objects, aspects and features of the present invention will become apparent from the following detailed description of a preferred embodiment of the present invention taken in connection with the accompanying drawings, throughout which like reference numerals denote like elements and parts.

DETAILED DESCRIPTION OF THE PREFERRED EMBODIMENT

Figure 1:
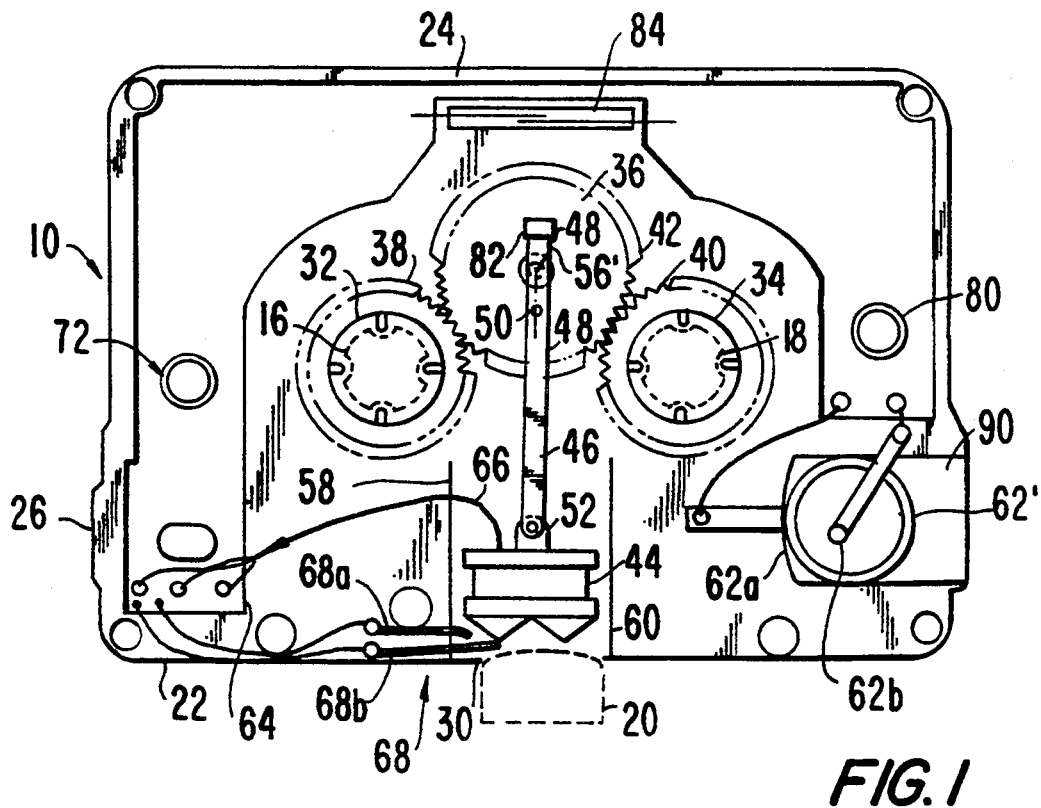
FIG. 1 is a top plan view of a preferred embodiment of the present invention, illustrating the apparatus with an electromagnet within the housing adjacent a magnetic head of a cassette tape recording and/or reproducing device.

Referring now to the drawings and initially to FIG. 1 thereof, a preferred embodiment of the present invention is constructed in a cassette-shaped housing 10 and may be considered disposed within a cassette holder or recess 12 of a cassette tape recording and/or reproducing device 14 (not illustrated) in precisely the same manner as a conventional tape cassette may be disposed in recess 12. The device 14 is of standard design and includes take-up and supply reel drive spindles 16, 18 (shown in phantom) extending perpendicularly into recess 12. Also positioned within recess 12 is a record/-playback head 20 (also shown schematically in phantom). The present description will be given with respect to a device 14 which includes a single head 20. Other such devices include a number of heads 20 and it will be apparent to one skilled in the art that the present invention encompasses a demagnetizing apparatus suitable or use in such devices for demagnetizing one, some or all heads 20 therein.

Housing 10 has a generally rectangular cross section with opposed front and back walls 22, 24 opposed left and right side walls 26, 28 and top and bottom walls (not illustrated). A wall portion 30 of front wall 22 is adjacent an operative position which head 20 assumes when device 14 is activated. Wall portion 30 in a conventional tape cassette would contain an opening through which the operative position head 20 extends to contact the tape within so as to record and/or playback signals therefrom. In the apparatus according to the present invention, wall portion 30 may have such an opening and defines a demagnetizing position adjacent head 20 at which a source of alternating magnetic field is positionable so that head 20 may be demagnetized by the removal of any residual accumulation of magnetism.

In place of the conventional take-up and supply wheels of a tape cassette, housing 10 includes first and second rotatably mounted hub gears 32, 34 which are adapted to engage respective ones of spindles 16, 18 of device 14 when housing 10 is inserted in recess 12. Each hub gear 32, 34 may be rotated in a selected one of clockwise and counter-clockwise directions by rotation of the respective spindles 16, 18 corresponding to forward and reverse feeding of the tape in a tape cassette.

A circular, intermediate gear 36 positioned between the first and second hub gears 32, 34 is rotatably mounted to be driven by either of the hub gears 32, 34. To this end, first and second hub gears 32, 34 have respective outer toothed peripheries 38, 40 and intermediate gear 36 has a third outer toothed periphery 42 which meshingly engages first and second toothed peripheries 38, 40 of first and second hub gears 32, 34, respectively. Thus, rotation of either first or second hub gear 32, 34 in a selected direction, clockwise or counter-clockwise, will cause intermediate gear 36 to rotate in opposition thereto, that is, counter-clockwise in order to achieve the demagnetizing effect. In accordance with the present invention, it is irrelevant whether intermediate gear 36 is rotated clockwise or counter-clockwise in order to achieve the demagnetizing effect. Consequently, either the forward or reverse play buttons on device 14 may be actuated for demagnetization, which reduces the chance of misoperation.

A magnetic field producer in the form of an electromagnet 44 is positionable at wall portion 30 in front wall 22. The magnetic field produced by electromagnet 44 is an alternating magnetic field having flux peaks of constant magnitude. Although some variation in the magnitude of the flux peaks may occur due to noise, for example, it is contemplated that the change in magnitude is not on the order of that needed to demagnetize head 20. Electromagnet 44 is connected to an advantageous alternating magnetic field generating circuit, discussed below.

Figure 2:
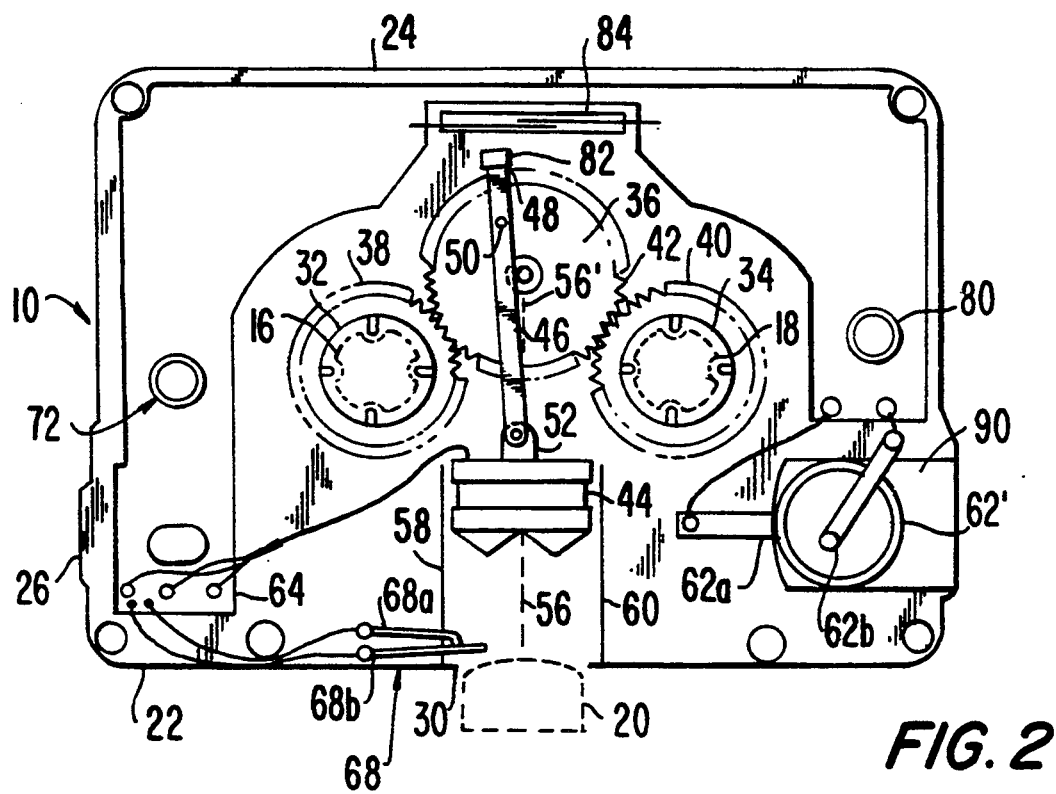
FIG. 2 is a top plan view of the embodiment of FIG. 1, illustrating the electromagnet at a position withdrawn from the magnetic head.

A push-pull rod 46 has an extended end 48 pivotally connected to intermediate gear 36 at an outer radial position 50 thereon. Push-pull rod has a second end 52 pivotally connected to electromagnet 44. Push-pull rod 46 has a length and radial position 50 on intermediate gear 36 such a distance from the center of intermediate gear 36 that when radial position 50 reaches its closest approach to wall portion 30, as illustrated in FIG. 1, electromagnet 44 will have been pushed by end 52 to be directly adjacent wall portion 30. However, as intermediate gear 36 is rotated by either hub gear 32, 34 to move radial position 50 away from wall portion 30, electromagnet 44 is cyclically withdrawn a significant distance from wall portion 30, as illustrated in FIG. 2, and then returned thereto. Consequently, although the alternating magnetic field produced by electromagnet 44 is maintained at a constant magnitude, the magnitude of the magnetic field at wall portion 30 itself is cyclically decreased as electromagnet 44 is withdrawn to produce the desired demagnetizing effect on head 20. In order to maximize the relative change in magnetic field for the stroke produced by intermediate gear 36 and push-pull rod 46, the motion of electromagnet 44 away from and towards wall portion 30 is limited to rectilinear reciprocation along a substantially linear path 56 (FIG. 2) with housing 10 perpendicular to wall 22 by guide means advantageously in the form of interior walls 58, 60 extending upwardly and molded integrally with the bottom wall of housing 10. In the preferred embodiment, intermediate gear 36 is mounted for rotation about a point lying on an extension 56' (FIG. 1) of path 56, shown in a dashed line, so that electromagnet 44 naturally tends to move along path 56. It will be understood that in apparatus such as in the present invention a degree of tolerance is permitted in the relative dimensions of intermediate gear 36, electromagnet 44, push-pull rod 46 and walls 58, 60 so that path 56 need not necessarily be perfectly linear or perfectly perpendicular to wall 22, nor need electromagnet 44 be perfectly centered at wall portion 30 or fully positioned thereat. A small amount of play will reduce manufacturing and assembly costs, an advantageous feature in a product of this type, but the motion of electromagnet 44 will be substantially rectilinear.

A magnet 82 is attached to extended end 48 of push-pull rod 46 and moves with it. Magnet 82 is used to actuate a non-contact reed switch 84 when push-pull rod 46 is approximately at its farthest extent. Each time magnet 82 swings past reed switch 84 as intermediate gear 36 rotates, reed switch 84 is momentarily actuated, thus providing a sensing signal which is used in an automatic shut-off circuit to shut off the alternating magnetic field generating circuit at a predetermined point and after a predetermined number of cycles in a manner to be described below.

As mentioned above, electromagnet 44 produces an alternating magnetic field having flux peaks of constant magnitude and the decreasing magnitude effect is achieved by cyclically withdrawing electromagnet 44 away from and back towards wall portion 30. Housing 10 also includes a DC power supply in the form of a 1.5 volt battery 62 and an advantageous circuit 64 for producing the alternating magnetic field of constant magnitude. Battery 62 is contained in a battery compartment having a cover 90. Both battery 62 and circuit 64 are fixedly mounted in housing 10. Circuit 64 includes an oscillator circuit portion 64c, to be described below, which repeatedly provides a pulse signal to electromagnet 44 through a flexible wire connection 66 in order to create the alternating magnetic field of constant magnitude in accordance with known principles. Flexible connection 66 permits the reciprocating motion of electromagnet 44 away from and towards wall portion 30 as described above.

The device preferably includes a novel power switch 68 which is automatically turned on when the recording/reproducing device is put into the "play" and/or "record" mode and turned off when not in one of those modes, as described below with reference to FIGS. 1, 2 and 5a and 5b.

The negative terminals 62a, 64a of battery 62 and circuit 64, respectively, are permanently connected together. Switch contact 68a is connected to the negative, or ground, terminal 62a of battery 62. Switch contact 68b is, in turn, connected to the positive terminal 62b of battery 62.

Figure 5A:
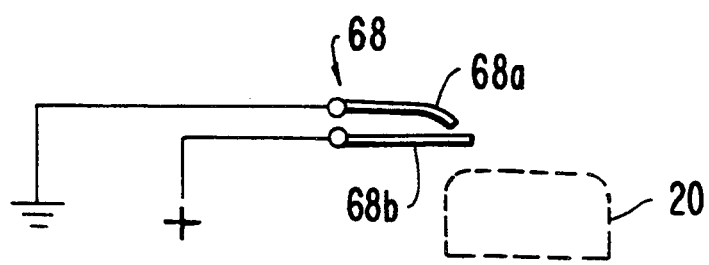
FIG. 5a is a top plan view of an automatic power switch in accordance with a preferred embodiment of the present invention, shown in the off position with the magnetic head retracted.
Figure 5B:
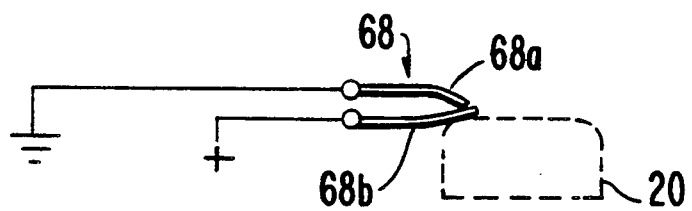
FIG. 5b is a top plan view of the automatic power switch depicted in FIG. 5a, shown in the on position with the magnetic head retracted.

The forward, or "play" or "record" position of the head is depicted in FIGS. 1, 2 and 5a and the retracted position is depicted in FIG. 5b. When it is desired to demagnetize the head, housing 10 is inserted into device 14 and the "play" or "record" button pressed, thus commencing either the "play" or "record" cycles. This causes head 20 to move forwardly toward switch 68, through the opening in wall portion 30 to the operative position head 20 would extend to contact the tape to record and/or playback signals therefrom, from the position shown in FIG. 5a to the position shown in FIG. 5b. As it does so, head 20 pushes resilient leaf contact 68b, which is connected to power terminal 62b, forwardly until it makes electrical contact with switch contact 68b, which is connected to a ground terminal 62a, thus closing switch 68 and delivering power to circuit 64. Switch 68 remains in this closed position as long as the magnetic head is in the "play" or "record" operating position. Conversely, switch 68 opens as soon as the magnetic head leaves the "play" or "record" operating position, thereby cutting off power. It remains in this open, i.e. off, position until the magnetic head is again returned to the "play" or "record" position. In this way, the operator need not remember to turn on or off the switch, thus eliminating both the possibility of failure to demagnetize and the possibility of unnecessary draining of the battery.

Figure 3:
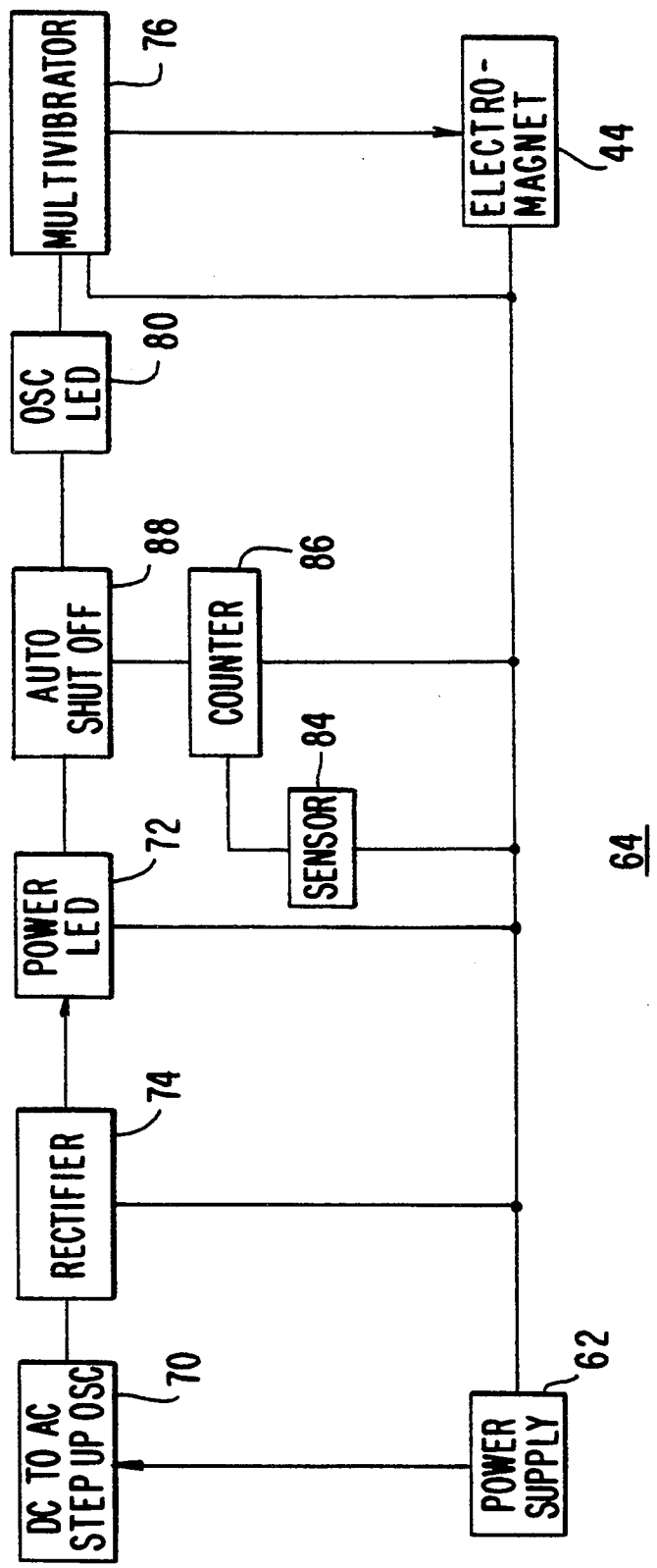
FIG. 3 is a schematic block diagram of a circuit for generating an alternating magnetic field of constant magnitude.
Figure 4:
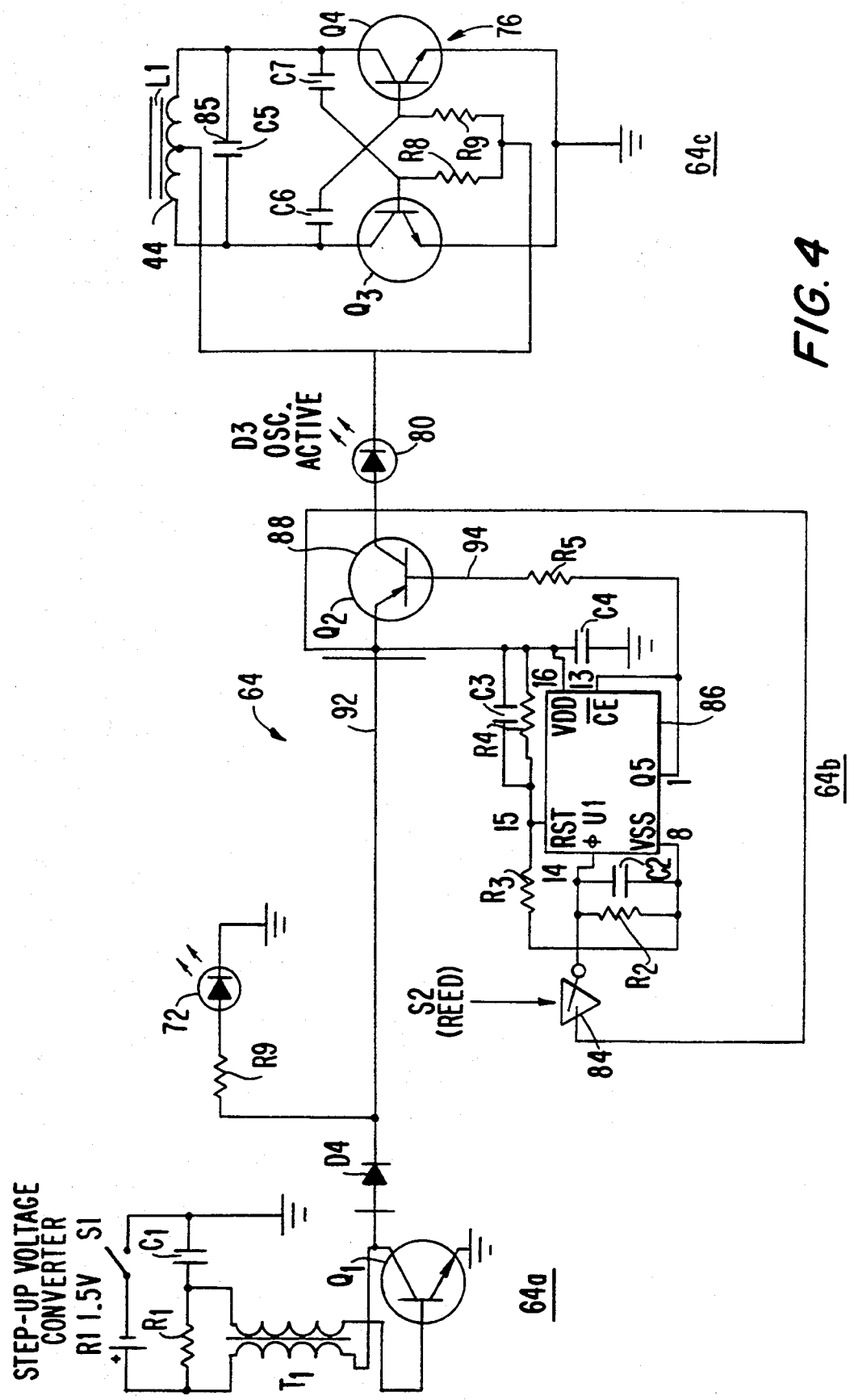
FIG. 4 is a circuit diagram of the circuit of FIG. 3.

When switch 68 is closed, power is supplied to circuit 64. Circuit 64 is illustrated in FIGS. 3 and 4 and includes a power supply circuit portion 64a, an automatic shut-off circuit portion 64b, and the oscillator circuit portion 64c for producing an alternating magnetic field of constant intensity.

Power supply circuit portion 64a includes a DC-to-ac step-up blocking type oscillator 70 which preferably supplies a 7 MHz, 3.4 volt peak-to-peak ac signal to a rectifier 74. LED 72 indicates that battery 62 is connected, i.e., that the power is on. Rectifier 74 rectifies the ac current to provide DC power of approximately 5 volts DC, with an approximately 7 MHz, 0.28 volt peak-to-peak ripple to oscillator circuit portion 64c. Oscillator circuit portion 68c preferably includes an astable multivibrator 76 and an LC tank circuit composed of the field radiating electromagnet 44 as the inductor and a small capacitor 85, which preferably provides a 6.4 MHz, 36 mV peak-to-peak pulse signal to electromagnet 44 to provide the demagnetizing alternating magnetic field of constant intensity. Oscillator circuit portion 64c also includes a LED 80 to indicate that power to being supplied to oscillator circuit portion 64c.

Interposed between power supply portion 64a and oscillator circuit portion 64c is automatic shut-off circuit portion 64b. Automatic shut-off circuit portion includes an transistor switch 88, which is preferably a PNP transistor, interposed in the power supply line 92 to oscillator circuit portion 64c. Transistor switch 88 is "on" and thus conducts power, unless voltage is supplied to the base via line 94.

Line 94 is connected to an output of a decade counter integrated circuit 86 (CD4017B). The choice of which output to use depends upon how many reciprocation cycles of push-pull rod 46 are desired before automatic shut-off occurs. It has been found that 3–7 cycles are sufficient for satisfactory demagnetization with the apparatus of the present invention. Accordingly, line 94 is preferably connected to either the number 3, 4, 5, 6, or 7 pin of the decade counter 86, preferably number 5, labeled Q5 in FIG. 5. It is to be understood, however, that any finite number of cycles, including 1, can be selected and thus any of the outputs of the decade counter 86 can be selected.

Decade counter 86 is powered by the output from power supply circuit portion 64a through connection VDD. Upon initial powering up of decade counter 86, decade counter is at the 0 pin. The signal input connection VSS of decade counter is connected to reed switch 84 which is, in turn, connected to the output of power supply circuit portion 64a. Thus, upon initial powering up of the circuit 64 by closure of switch 68, no voltage is present in line 94 to the base of transistor switch 88, and thus switch 88 is open, supplying power to oscillator circuit portion 64c. LED 80 is also powered, and thus on, indicating to the operator that the alternating magnetic field is being produced.

As intermediate gear 36 rotates during the "play" or "record" modes, magnet 82 will repeatedly be swung into proximity with reed switch 84, to momentarily close reed switch 84. Each time reed switch 84 closes in response to the proximity of magnet 82, a voltage is applied to input VSS, which advances the output of the decade counter 86 by one. As soon as the number of such sensings has advanced the output of the decade counter to the output connected to base 94 of transistor 88, a voltage is applied to base 94, thus shutting off transistor 88 and thereby cutting off power to the oscillator circuit portion 64c. Since the cut off of power to oscillator circuit portion 64c occurs substantially at the instant of the last sensing of the proximity of magnet 82 to reed switch 84, this cut off of power also occurs at the point when electromagnetic 44 is at its farthest point from head 20. At this point, the intensity of the magnetic field at head 20 is at a minimum, thus resulting in optimum demagnetization.

This voltage applied through line 94 to the base of transistor switch 88 is also applied to the disable input connection CE-bar of the decade counter, thus stopping further advance of the decade counter. Thus, power remains cut off to the oscillator circuit portion 64c.

At this time, LED 80, which no longer has power, turns off, thus indicating the end of the demagnetizing operation to the operator. The operator then pushes the "stop" button, which moves the play/record heads rearwardly, thus shutting off switch 68. The operator then removes the demagnetizing apparatus 10 from the recording/reproducing apparatus 14.

It will be understood by those skilled in the art that these specifications, while providing an advantageous construction for circuit 64, may be considerably varied while still producing an appropriate magnetic field. Indeed, other circuits and magnetic field producers utilizing different types of elements may also be used provided the magnetic field generated thereby has a substantially constant magnitude.

FIG. 4 illustrates a circuit diagram for the circuit of FIG. 3, indicating an advantageous specification of circuit elements to produce the recited signals and functions.

The present invention has been described in connection with a preferred embodiment, but it will be apparent to one skilled in the art that many modifications and changes are possible without departing from the spirit or scope of the present invention. For example, while the preferred embodiment includes an intermediate gear which may be driven by either one of two hub gears, an alternative embodiment might include only a single hub gear or a different means for coupling the hub gear to the electromagnet. Therefore, the scope of the present invention should be determined by reference to the appended claims.

We claim:

1. Apparatus for demagnetizing a magnetic head of a cassette tape recording and/or reproducing device of the type having holding means capable of holding a cassette in predetermined relation to said head when said head is at an operative position, and tape transport means including first and second spaced reel drive spindles, the apparatus comprising:
   a cassette-shaped housing adapted to be held by said holding means and having a portion of a wall adjacent said head at said operative position when said housing is held by said holding means;
   hub members rotatably mounted in said housing and adapted to be driven in rotation by at least one of said drive spindles;
   electromagnet means including an electromagnet and operative electrical connection therefor for producing an alternating magnetic field having flux peaks of constant magnitude, said electromagnet means being positionable at said wall portion;
   mechanical coupling means for coupling said electromagnet means to said hub members so that said electromagnet means is rectilinearly reciprocated with respect to said wall portion along a path within said housing substantially perpendicular to said wall portion in response to rotation of said hub members; and
   automatic shut-off means for shutting off power to said electromagnet means when a predetermined number of reciprocation cycles has been reached and when said electromagnet means is at its farthest point from said head.

2. Apparatus according to claim 1, further comprising means for generating an alternating magnetic field including battery means for generating DC power, DC-ac step-up oscillator means responsive to said DC power for generating an ac signal, rectifier means for rectifying said ac signal and producing a rectified output, and astable multivibrator means receiving said rectified output for providing a pulse signal to said electromagnet means, said electromagnet means producing said magnetic field in response to said pulse signal.

3. Apparatus according to claim 1, further comprising automatic on/off power switch means for automatically connecting said battery means to said oscillator means when said head is moved to its play/record position.

4. Apparatus according to claim 3, further comprising indicator means responsive to actuation of said switch means to indicate connection of said battery means.

5. Apparatus according to claim 4, further comprising indicator means responsive to the supplying of power to said electromagnet means.

6. Apparatus according to claim 3, wherein said switch means includes a contact adapted to be pushed by forward movement of said head toward said switch into a corresponding contact to close the switch.

7. Apparatus for demagnetizing a magnetic head of a cassette tape recording and/or reproducing device of the type having holding means capable of holding a cassette in predetermined relation to said head when said head is at an operative position, the tape transport means including first and second spaced reel drive spindles, the apparatus comprising:

a cassette-shaped housing adapted to be held by said holding means and having a portion of a wall adjacent said head at said operative position when said housing is held by said holding means;

hub members rotatably mounted in said housing and adapted to be driven in rotation by at least one of said drive spindles;

electromagnet means including an electromagnet and operative electrical connection therefor for producing an alternating magnetic field having flux peaks of constant magnitude, said electromagnet means being positionable at said wall portion;

mechanical coupling means for coupling said electromagnet means to said hub members so that said electromagnet means is rectilinearly reciprocated with respect to said wall portion along a path within said housing substantially perpendicular to said wall portion in response to rotation of said hub members; and automatic shut-off means for shutting off power to said electromagnet means when a predetermined number of reciprocation cycles has been reached and when said electromagnet means is at its farthest point from said head, said automatic shut-off means comprising means for determining when the electromagnet means is at its farthest point from said head, counting means for counting the number of reciprocation cycles of said electromagnet means, and shut-off means for shutting off power to said electromagnet means when the number of reciprocation cycles reaches a predetermined number and when said electromagnet means is at its farthest point from said head.

8. Apparatus for demagnetizing a magnetic head of a cassette tape recording and/or reproducing device of the type having a holding means capable of holding a cassette in predetermined relation to said head when said head is at an operative position, and tape transport means including first and second spaced reel drive spindles, the apparatus comprising:

a cassette-shaped housing adapted to be held by said holding means and having a portion of a wall adjacent said head at said operative position when said housing is held by said holding means;

first and second hub gears rotatably mounted in said housing and adapted to engage respective spindles of said device for rotation thereby;

a circular, rotatable intermediate gear positioned between said first and second hub gears and meshingly engaging said first and second hub gears, whereby said intermediate gear is rotatable by rotation of either of said hub gears;

means for generating an alternating magnetic field having flux peaks of constant magnitude and including an electromagnet at which said magnetic field is produced, said electromagnet being positionable at said wall portion;

push-pull rod means having a first end pivotally connected to said intermediate gear at an outer radial position thereof and having a second end pivotally connected to said electromagnet for cyclically withdrawing said electromagnet from said wall portion and returning the same thereto;

guide means for limiting motion of said electromagnet away from and towards said wall portion to rectilinear reciprocation along a substantially linear path perpendicular thereto; and automatic shut-off means for shutting off power to said electromagnet means when a predetermined number of reciprocation cycles has been reached and when said electromagnet means is at its farthest point from said head.

9. Apparatus according to claim 8, further comprising means for generating an alternating magnetic field including battery means for generating DC power, DC-ac step-up oscillator means responsive to said DC power for generating an ac signal, rectifier means for rectifying said ac signal and producing a rectified output, and astable multivibrator means receiving said rectified output for providing a pulse signal to said electromagnet means, said electromagnet means producing said magnetic field in response to said pulse signal.

10. Apparatus according to claim 8, further comprising automatic on/off switch means for automatically connecting said battery means to said oscillator means when said head is moved to its play/record position.

11. Apparatus according to claim 10, further comprising indicator means responsive to actuation of said switch means to indicate connection of said battery means.

12. Apparatus according to claim 11, further comprising indicator means responsive to the supplying of power to said electromagnet means.

13. Apparatus according to claim 12, wherein said switch means includes a contact adapted to be pushed by forward movement of said head into a corresponding contact to close the switch.

14. Apparatus for demagnetizing a magnetic head of a cassette tape recording and/or reproducing device of the type having a holding means capable of holding a cassette in predetermined relation to said head when said head is at an operative position, and tape transport means including first and second spaced reel drive spindles, the apparatus comprising:
- a cassette-shaped housing adapted to be held by said holding means and having a portion of a wall adjacent said head at said operative position when said housing is held by said holding means;
- first and second hub gears rotatably mounted in said housing and adapted to engage respective spindles of said device for rotation thereby;
- a circular, rotatable intermediate gear positioned between said first and second hub gears and meshingly engaging said first and second hub gears, whereby said intermediate gear is rotatable by rotation of either of said hub gears;
- means for generating an alternating magnetic field having flux peaks of constant magnitude and including an electromagnet at which said magnetic field is produced, said electromagnet being positionable at said wall portion;
- push-pull rod means having a first end pivotally connected to said intermediate gear at an outer radial position thereof and having a second end pivotally connected to said electromagnet for cyclically withdrawing said electromagnet from said wall portion and returning the same thereto;
- guide means for limiting motion of said electromagnet away from and towards said wall portion to rectilinear reciprocation along a substantially linear path perpendicular thereto; and
- automatic shut-off means for shutting off power to said electromagnet means when a predetermined number of reciprocation cycles has been reached and when said electromagnet means is at its farthest point from said head, said automatic shut-off means comprising means for determining when the electromagnet means is at its farthest point from said head, counting means for counting the number of reciprocation cycles of said electromagnet means, and shut-off means for shutting off power to said electromagnet means when the number of reciprocation cycles reaches a predetermined number and when said electromagnet means is at its farthest point from said head.

* * * * *